April 18, 1967  T. M. ROBERTS  3,314,583
FRICTION WELDING DEVICES FOR JOINING LENGTHS OF WIRE
Filed April 16, 1964  3 Sheets-Sheet 1

Inventor
Thomas M. Roberts
By Kenon Palmer
Stewart & Estabrook
Attorneys

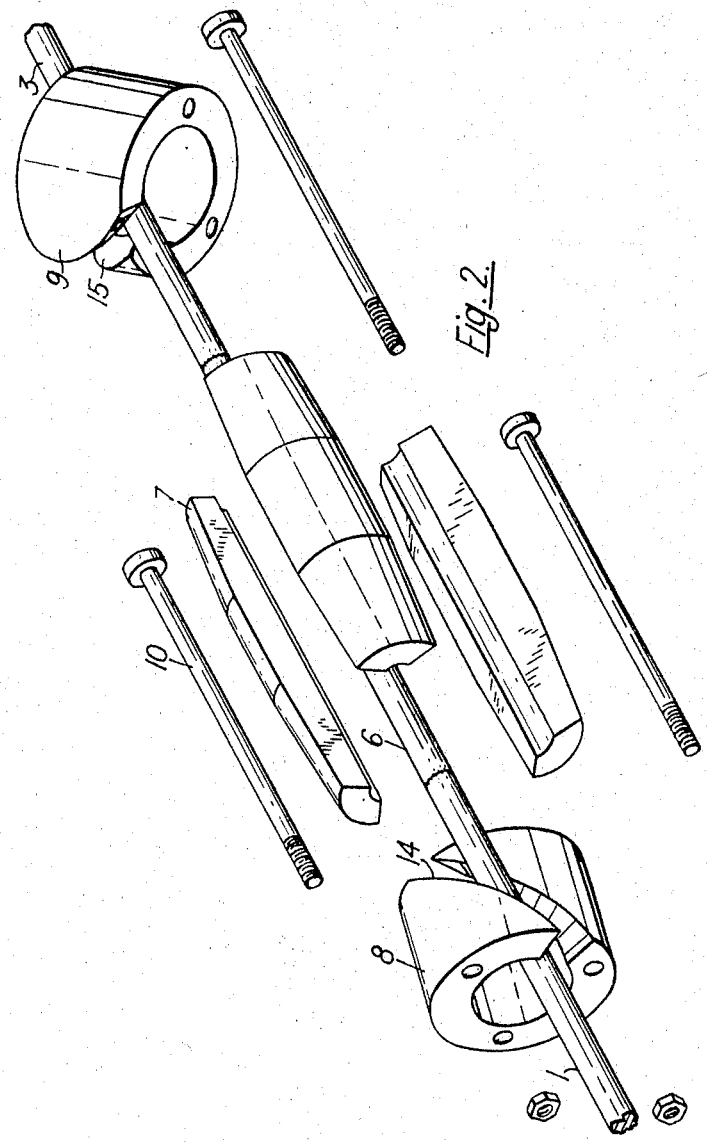

April 18, 1967  T. M. ROBERTS  3,314,583
FRICTION WELDING DEVICES FOR JOINING LENGTHS OF WIRE
Filed April 16, 1964  3 Sheets-Sheet 3
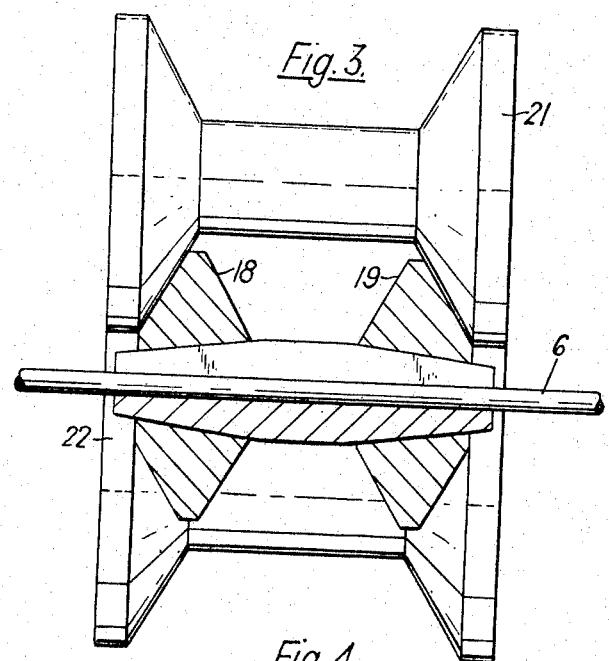
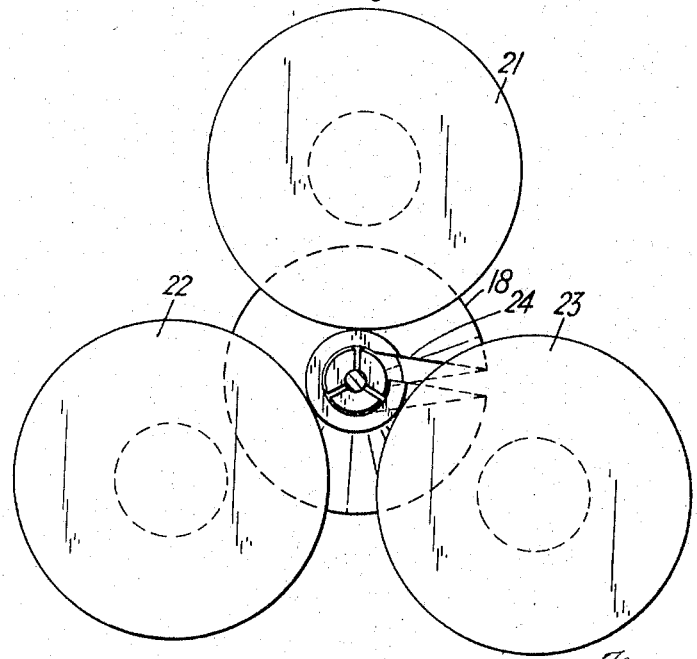
Inventor
Thomas M. Roberts
By Kemon Palmer,
Stewart & Estabrook
Attorneys

United States Patent Office 3,314,583
Patented Apr. 18, 1967

3,314,583
FRICTION WELDING DEVICES FOR JOINING LENGTHS OF WIRE
Thomas Marmaduke Roberts, Abington Hall, Cambridge, England, assignor to British Welding Research Association, a body corporate of Great Britain
Filed Apr. 16, 1964, Ser. No. 360,299
Claims priority, application Great Britain, Apr. 22, 1963, 15,781/63
2 Claims. (Cl. 228—2)

This invention relates to the joining of lengths of wire to form them into one continuous piece.

According to the invention, two lengths of wire are joined by placing a wire insert between them and rotating it about its axis in contact under low pressure with the ends of the lengths to be joined and, when sufficient heat has been generated between the faces in contact at the ends of the insert, stopping the rotation and increasing the pressure at these faces so as to join the ends of the insert by friction welding to the ends of the lengths to be joined.

The wire insert may be held in a collet which is tightened on the insert by means of two sleeves which fit over the collet end and are connected by bolts. These sleeves must be slotted to permit their removal from the resultant continuous length of wire. They may also be used as driving sleeves to which rotation is imparted by pressure rollers arranged around the periphery of the sleeves.

The invention thus overcomes the difficulty of friction welding two long lengths of wire. As it is impossible to rotate one of the lengths of wire as a whole, a wire insert is rotated and to avoid the difficulty of removing the driving means for the insert from the continuous length of wire once the welds have been made, the drive is transmitted to the wire insert through a collet.

In order that the invention may be better understood two examples of apparatus for carrying the invention into effect will now be described with reference to the accompanying drawings in which:

FIGURE 2 is an exploded view of the parts for holding the wire insert; and

FIGURES 3 and 4 show an alternative form of apparatus.

Figure 1:
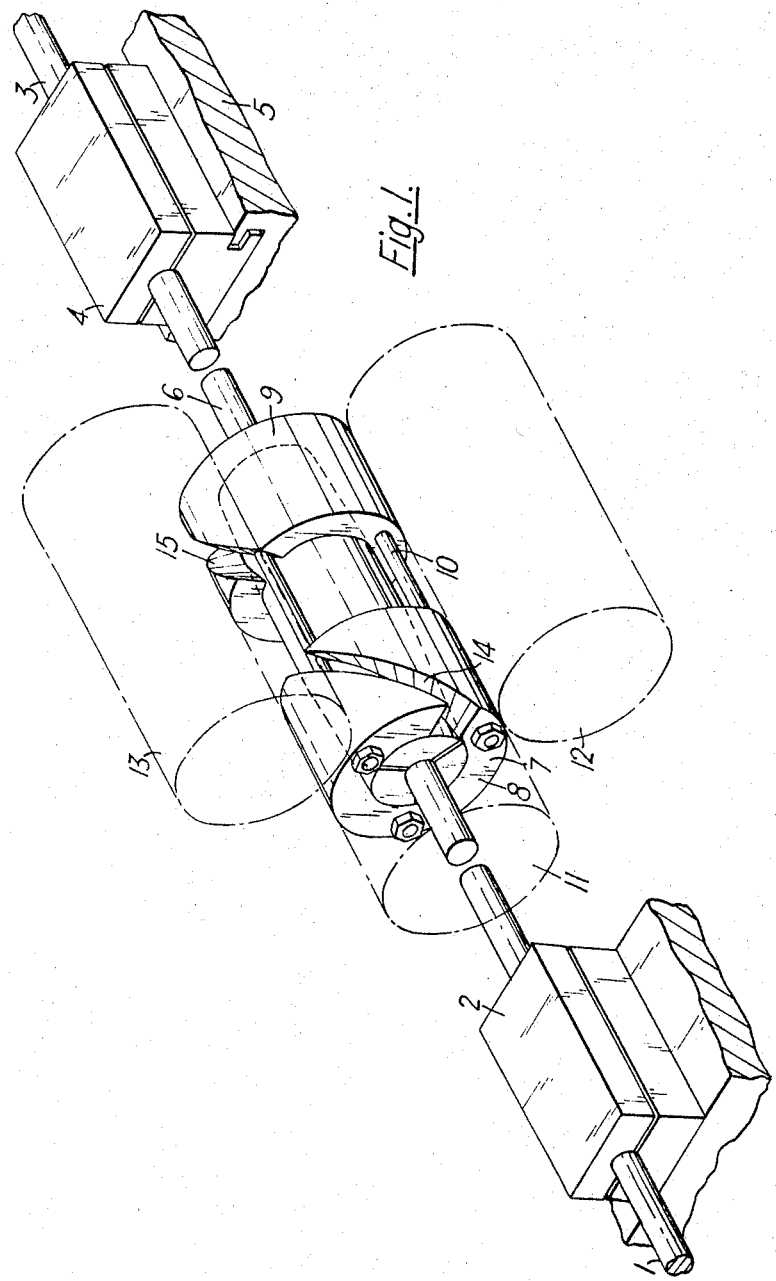
FIGURE 1 illustrates a first form of apparatus for the friction welding of the wire insert to the lengths of wire to be joined.

In the apparatus shown in FIGURES 1 and 2, the end of a first length of wire 1 is held in a fixed clamp 2 and the end of a second length of wire 3, to which the wire 1 is to be joined, is held in a sliding clamp 4 mounted on a block 5 in such a manner as to permit movement of the clamp 4 towards and away from the clamp 2. A wire insert 6 is held between the three jaws of a collet 7 and the jaws of the collet are held in place by means of two sleeves 8 and 9 which fit over the collet and can be drawn together by means of tie bolts 10 to tighten the collet jaws onto the wire insert. The sleeves 8 and 9 should be internally tapered over at least a portion of their lengths to conform to the external taper of the collet.

The wire insert 6 is rotated through the sleeves 8 and 9 which act as drive sleeves and are driven in rotation by the drive rollers 11 and 12, the roller 13 constituting a pressure roller. Before rotation commences, the sliding block 4 is advanced until the faces of the wires 1 and 6 and the faces of the wires 6 and 3 are in contact with one another under a pressure which in the case of carbon steel wire of ⅜-inch diameter and with an insert rotation of 2000 revolutions per minute, should be of the order of 0.3 ton. When this has continued for a time sufficient to achieve the required welding temperature and to cause the metal at the faces to flow, the rotation is stopped and a forging pressure of the order of 1.25 tons is applied at the faces. This results in a friction weld between each pair of contacting faces, with a loss in length of up to 0.1 inch. When the friction welds have been made the tie bolts are released and the sleeves 8 and 9 are displaced axially to free the collet jaws 7. The sleeves 8 and 9 have helical slots 14 and 15 which enable them to be threaded over the resultant continuous wire as illustrated in FIGURE 2.

A force of 1 ton on the pressure roller provides adequate driving torque for welding rods of ½-inch in diameter. For stainless and rust resisting steels the forces given above are doubled because of the high hot strength of the steels.

FIGURES 3 and 4 illustrate an alternative form of apparatus for holding and driving the wire insert. In this apparatus the sleeves 18 and 19 are formed with external tapers which contact with corresponding tapers on the pressure and driving rollers 21, 22 and 23. As before, each sleeve is formed with a helical slot to permit its removal from the continuous length of wire when the friction welded joints have been made. The slot 24 of the sleeve 18 can be seen in FIGURE 4.

The process of friction welding is fully described in "The Friction Welding of Metals" by V. I. Vill, published by the American Welding Society.

I claim:
1. An apparatus for welding an intermediate wire to two outer wires in which the intermediate wire is rotated about its axis in contact under low pressure with the ends of the two outer wires to be joined until sufficient heat for bonding has been generated between the contacting surfaces and in which the rotation is then stopped and the pressure increased to complete the friction bond comprising:
    (a) two outer clamps,
    (b) an intermediate clamp,
    (c) one of said outer clamps having clamping surfaces defining an opening for clamping one of said outer wires,
    (d) the other of said outer clamps having clamping surfaces defining an opening which is in axial alignment with the opening of said one outer clamp for clamping the other of said outer wires in axial alignment with said one outer wire,
    (e) at least one of said outer clamps being mounted for axial movement toward the other of said outer clamps to provide pressure contact between the ends of the wires to be bonded.
    (f) said intermediate clamp having clamping surfaces defining an opening which is in axial alignment with the openings of said outer clamps for clamping said intermediate wire between said two outer wires, said intermediate clamp further comprising,
        (1) a collet to be placed around said intermediate wire
        (2) a pair of slotted sleeves fitting over the collet and axially movable to permit the tightening of the collet on said intermediate wire, and
        (3) means for axially moving said pair of slotted sleeves,
    (g) means cooperating with the exterior of said slotted sleeves for rotating the intermediate clamp and thus the intermediate wire.
2. Apparatus as defined by claim 1 in which said slotted sleeves are internally tapered and said collet is externally tapered to conform to the internal taper of said sleeves, said sleeves also having an external taper and said means for rotating said intermediate clamp having a tapered surface conforming to the external taper on said sleeves.

References Cited by the Examiner

UNITED STATES PATENTS 2,119,520  6/1938  Brokering _____ 29—493
3,134,278  5/1964  Hollander et al. ____ 29—470.3

FOREIGN PATENTS 597,036  8/1959  Italy.

OTHER REFERENCES

Vill, Friction Welding of Metals, June 25, 1969, American Welding Society, pp. 2, 3, 37 and 38.

JOHN F. CAMPBELL, *Primary Examiner.*

M. L. FAIGUS, *Assistant Examiner.*